United States Patent [19]
McShane

[11] Patent Number: 5,042,673
[45] Date of Patent: Aug. 27, 1991

[54] ELECTRIC BOX EXTENSION

[76] Inventor: William J. McShane, 837 Margo La., Penn Valley, Pa. 19072

[21] Appl. No.: 596,740

[22] Filed: Oct. 12, 1990

Related U.S. Application Data

[63] Continuation of Ser. No. 370,710, Jun. 22, 1989, abandoned.

[51] Int. Cl.⁵ .............................................. H02G 3/08
[52] U.S. Cl. ...................................... 220/3.7; 174/57
[58] Field of Search ...................... 220/3.7, 3.6; 174/57

[56] References Cited

U.S. PATENT DOCUMENTS

| | | | |
|---|---|---|---|
| 1,693,396 | 11/1928 | Littleton | 220/3.6 X |
| 2,378,861 | 6/1945 | Peevey | 220/3.7 X |
| 2,531,698 | 11/1950 | Petrick et al. | 220/3.7 X |
| 2,590,391 | 3/1952 | Elmore | 220/3.6 |
| 2,989,206 | 6/1961 | McAfee | 220/3.7 |
| 3,433,886 | 3/1969 | Myers | 220/3.7 X |
| 3,651,245 | 3/1972 | Moll | 220/3.7 X |
| 3,720,783 | 3/1973 | Moll | 220/3.7 X |
| 4,019,647 | 4/1977 | Arnold | 220/3.6 X |
| 4,634,015 | 1/1987 | Taylor | 220/3.7 |

OTHER PUBLICATIONS

PittLine Mini Catalog No. 1184, Thepitt Manufacturing Company, pp. 3 and 24.

Primary Examiner—Steven M. Pollard
Attorney, Agent, or Firm—Paul & Paul

[57] ABSTRACT

An improved electrical box extension can be used to easily and securely mount an electrical device, such as a switch or electric outlet, flush with a new surface installed over an existing surface, using an existing electrical box which is fixed within the existing surface. The electrical box extension comprises a generally tubular body sized to receive an electrical device, and to be received within an existing electrical box. The body has flanges extending outwardly, and depth adjustment screws extend between the flanges and attachment bars mounting the electrical box extension on the existing electrical box. The box and adjustment screws can be used with an electrical box having integral attachment bars.

15 Claims, 4 Drawing Sheets

ELECTRIC BOX EXTENSION

This application is a continuation, of application Ser. No. 07/370,710 filed June 22, 1989 now abandoned

BACKGROUND OF THE INVENTION

1. Field of the Invention

This invention relates generally to electical equipment, and more specifically to means for housing electric devices such as switches and outlets.

2. Brief Description of the Prior Art

Electical boxes formed from sheet metal or plastic materials are widely used for housing electrical devices such as switches, outlets, and the like, and for permanently mounting such devices in walls, ceilings or floors. Typically such boxes are anchored by nailing or otherwise permanently affixing the box, or a bracket on which such a box can be mounted, to a structural element such as a wall stud, a ceiling or floor joist, or the like. Once the box has been mounted in this manner, it is very difficult to remove or reposition. The box is usually mounted so that its outward, open face is flush with the surface, such as a wall, in which it is mounted. After mounting the box, wiring is brought into it for connection to the electrical device which it is intended to house. The function of the box is to provide a means of mounting the electrical device, and to isolate the electrical device from its environment to reduce potential electrical shock and fire hazards.

As new housing becomes increasingly expensive, the rehabilitation and remodeling of existing housing becomes increasingly attractive. Often older housing which is to be reconditioned has walls and ceilings which have numerous esthetic and/or structural deficiencies. It is frequently desirable to install new sheet stock, such as sheetrock, foam insulation, or laminated "paneling," directly over the existing surfaces, rather than remove the existing walls and ceilings first. When this is done, holes can be cut for existing switch and outlet boxes. However, when the new sheet stock has been installed, the existing boxes are no longer flush with the surface, but rather are set back in the surface by the thickness of the new sheet stock. Also, in new work boxes are often set crooked, and some even stick out too far. For esthetic and practical reasons, the electrical devices, including switches and outlets, must be positioned at the surface. However, the existing boxes can no longer adequately serve their protective function, since the portion of the electric device extending between the surface and the box will be exposed to the surrounding sheet material. Actually moving the box so that its face is flush with the new surface is not practical, since this would likely entail disconnecting the device from its associated wiring and extensive additional labor.

The prior art has approached this problem by fashioning box extentions of two different general types. The first type has walls of the same general configuration as the box to be extended, and of a fixed depth or thickness. The extension is simply screwed onto the existing box, and the electrical device is screwed onto the extention. Although this type of extension is available is a variety of thicknesses or depths, the fact that the thickness is fixed is often a disadvantage, since several layers of new sheet stock may be installed, and the resulting surface will frequently lie at some non-standard height above the original surface.

The second type of extension has a body which slidably extends within the existing box and relies on a friction fit with the interior surface of the existing box for mounting. This type of extension may not provide a secure mounting for the installed electrical device. For example, an outlet may be pushed back into the wall in which it is mounted when an electrical plug is forcefully inserted. Worse still, when a plug is repeatedly removed and reinserted, the outlet may be may be alternately pulled and pushed, stressing and loosening the wires supplying power to the outlet.

There is a need for an electrical box extension which can be used to safely and securely mount an electrical device such as a switch or outlet flush with a new surface on an electrical box fixed in an underlying existing surface, and in new construction there is a need for a new, integerally adjustable electric box to correct the alignment of the box which is set crooked, out too far, or too deep.

SUMMARY OF THE INVENTION

The present invention provides an improved electrical box extension which can be used to easily and securely mount an electrical device such as a switch or electric outlet, flush with a new surface installed over an existing surface, onto an existing electrical box which is fixed within the existing surface.

The electrical box extension comprises a generally tubular body having at least one wall and a first open face and a second open face. The body is sized to receive an electrical device, such as a switch or an electrical outlet, and to be received within an existing electrical box having an open face and at least one wall. The at least one wall of the body extends proximate to and generally parallel to the at least one wall of the electrical box. The body has at least two flanges extending outwardly from at least one wall proximate the first open face of the body. Each flange includes at least one threaded aperture for mounting the electrical device and at least two additional apertures.

The electrical box extension further comprises at least two attachment bars for mounting the electrical box extension on the existing electrical box. Each attachment bar includes a center aperture for screwing the bar to a flange extending from the existing electrical box. Each attachment bar further includes at least two additional apertures, which may be threaded for use with threaded attachment means or untreaded for use with self-tapping attachment means. The additional apertures of the attachment bars are aligned with the additional apertures of the body flanges when the electrical box extension is assembled.

In addition, the electrical box extension further includes a plurality of parallel depth adjustment means or screws extending between the body flanges and the attachment bars. Each depth adjustment means has a thread-free upper portion and a threaded lower portion. Each depth adjustment means is rotatably mounted in one of the additional apertures of the flanges, and extends through a respective one of the additional apertures of an attachment bar. Like rotation of each of the depth adjustment means causes the body to move uniformly in or out of the electrical box on which the electric box extension is mounted by a distance proportional to the extent of rotation. In this way, the first or front open surface can be aligned to be parallel to an existing or new surface in which the electrical box is mounted, even if the box itself is not aligned parallel to the existing or new surface.

The attachment bars can be made integral parts of a new electrical box for new construction so that the body of the electrical box extension can be mounted onto the new electrical box by aligning the adjustment screws attached through the two additional apertures in the flanges.

New electrical boxes with the extension attached are helpful in present drywall installation and in future remodeling, when walls and ceilings are to have insulation, tile, or other sheet goods applied, leaving the electrical outlets set too deep. By turing the adjustment screws the extension will rise flush with the new surface.

DETAILED DESCRIPTION OF THE PREFERRED EMBODIMENTS

Figures 1, 1A, 1B, 2:
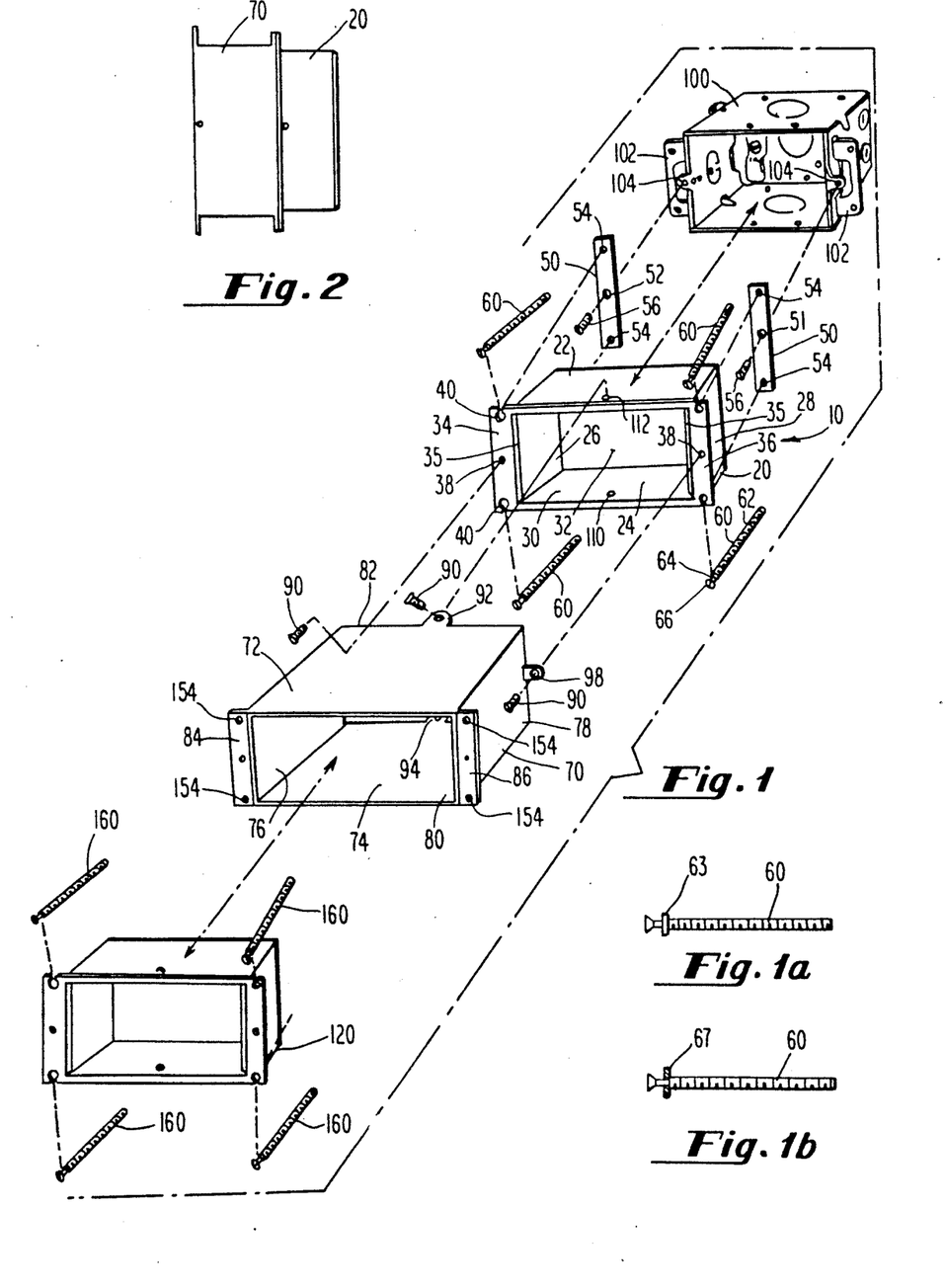
FIG. 1 is an exploded perspective view of a presently preferred embodiment of the electrical box extension of the present invention.
FIG. 1a is a perspective view of a depth adjustment screw according to the present invention.
FIG. 1b is a perspective view of another depth adjustment screw according to the present invention.
FIG. 2 is a side elevational view showing the electrical box extension of FIG. 1 partially assembled.

Referring now to the drawings in detail. wherein like reference numerals indicate like elements in each of the several views, reference is first made to FIG. 1, wherein an improved electrical box extension 10 according to the present invention is shown in an exploded perspective view.

The electrical box extension 10 is to be mounted on an existing electrical box 100 of conventional generally rectangular design, of the type commonly formed from sheet metal and adapted for mounting a single electrical switch or outlet intended to receive a pair of appliance plugs or the like. The box 100 is enclosed on four sides and at the back with generally rectangular walls which are adaptable to running electrical wire or cable therethrough and an open face for receiving the electrical device to be mounted therein. The box 100 has two sets of opposed flanges 102, 104 extending outwardly from opposite sides of the box 100 proximate the open face of the box 100. The exterior set 102 can be used to position the box 100 in the wall, ceiling or floor in which it is to be mounted, and each flange of the interior set 104 includes an aperture adapted to receive a screw for mounting the electrical device (not shown) in the box 100.

Typically electrical box extensions of the present invention will be useful after one or more additional sheets of material or the like have been applied over the existing surface in which a box 100 is already mounted, and the electrical device must be positioned outwards from the existing box 100. This situation frequently arises in remodeling and rehabilitation of older, existing structures, when new surfacing materials are installed over older walls, ceilings, or the like, which may be severely cracked or otherwise damaged. In new work the sheetrock tends to be relatively straight but the framing members may be irregular, causing electrical boxes to be positioned too far inward or too far outward, rather than at the surface of the sheetrock. In installing the new materials, holes are made to be positioned over existing electrical boxes (not shown).

The improved electrical box extension 10 shown in FIG. 1 includes a first generally tubular or conical body 20 having four generally rectangular walls 22, 24, 26, 28 arranged in two sets of two equally dimensioned and generally parallel walls 22, 24 and 26, 28. The first body 20 has a first or front open face 30 and a second or rear open face 32 of generally like dimensions.

Preferably, opposed pairs of walls 22, 24 and 26, 28 are slightly closer together at the rear face 32 than at the front face 30, to give a body 20 which tapers inwardly to provide a body 20 which can easily be inserted into the open face of an existing electrical box, and is less likely to be obstructed by rough edges, indentations, out-of-line knockouts, broken-off or short screws, or the like. Similarly, it will be easier to position such a body 20 in some types of older plastic electrical boxes which have slightly conical or tapering bodies themselves.

Extending outwardly from each of a pair of walls 26, 28 and generally perpendicular to those walls 26, 28 proximate the open face 30 is a flange 34, 36 for mounting the first body 20 to the electrical box 100 and for mounting an electrical device (not shown) onto the first body 20. The flanges 34, 36 each have a central, threaded aperture 38 positioned for attaching the electrical device to the first body 20 by screws. In addition, the flanges 34, 36 each include an additional pair of slotted apertures or slots 40 to be used in mounting the first body 20 to the electrical box 100. The edges 35 formed between the flanges 34, 36 and the respective walls 26, 28 is chamfered or cut away to ease the fit of certain electrical devices within the first body 20.

Figure 7:
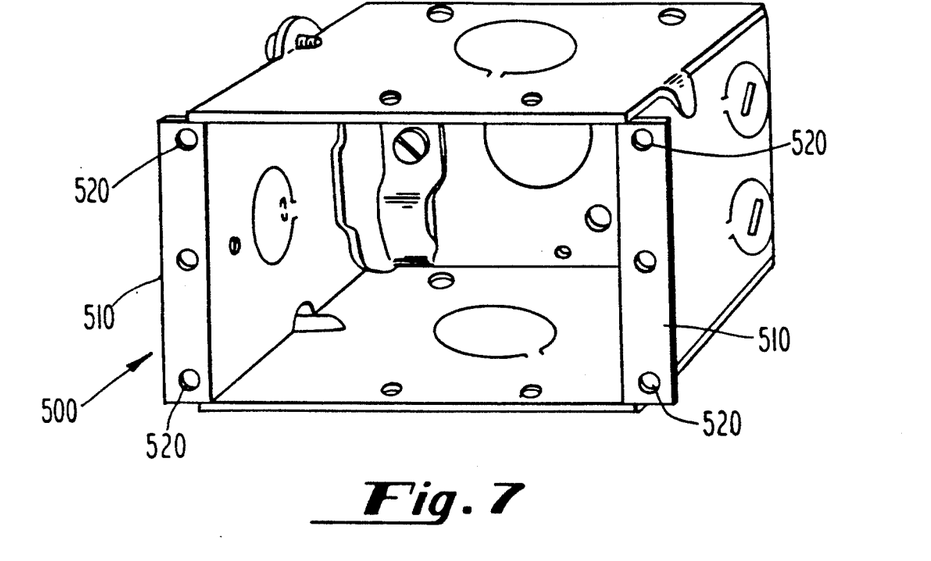
FIG. 7 is a perspective view of a new electrical box adopted for for use with the electrical box extension of the present invention.

The electrical box extension 10 also includes a pair of generally rectangular attachment bars 50 each having a central aperture 52 for attaching each bar 50 to a respective interior flange 104 of the electrical box 100. Each attachment bar 50 also includes a pair of additional apertures 54 spaced so as to be alignable with the slotted apertures 40 of the first body flanges 34, 36 when the electrical box extension 10 is assembled or installed. The additional apertures 54 can be threaded or can be untreaded, depending on whether the means for attaching the body to the bars are self-tapping. Alternatively, electrical boxes 500, such as shown in FIG. 7, can be manufactured having flanges 510 or other structural features (not shown) including additional apertures 520 to receive depth adjustment screws for mounting tubular bodies of the present invention.

Figure 3:
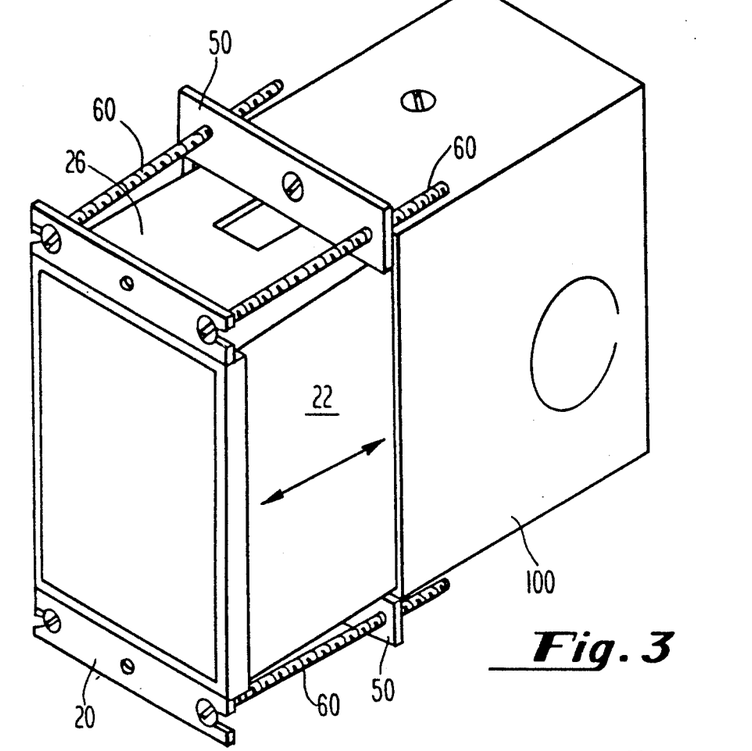
FIG. 3 is a perspective view of a the electrical box extension of FIG. 1 shown assembled and mounted on a rectangular electrical box.

In addition, the electrical box extension 10 also includes four depth adjustment means or screws 60 each having a threaded lower portion 62 adapted to be received by the additional apertures 54, a preferably thread-free upper portion 64 adapted to be received within the slotted apertures 40 of the first body flanges 34, 36, and a slotted head 66. The slotted apertures 40 preferably are formed so that the upper portions 64 can be press fit through a constriction which retains the screws 60 but permits them to freely rotate in the apertures 40, such as can be seen in FIG. 3. In addition, the depth adjustment screws can include a collar 63 (FIG. 1a) or washer 67 (FIG. 1b) positioned intermediate the upper portion 64 and lower portion 62.

As best seen in FIG. 1, when the electrical box extension 10 is assembled the depth adjustment screws 60 extend in parallel between the first body 20 and the attachment bars 50. Each depth adjustment screw 60 is then rotatably mounted in one of the slotted apertures 40 and extends through a respective one of the additional apertures 54 of the attachment bar 50. Like rotation with a screwdriver (not shown) of each of the depth adjustment screws 60 causes the first body 20 to move uniformly in or out of the electrical box 100 by a distance proportional to the extent of the rotation. When the electrical box extension 10 is assembled, such as shown in FIG. 3, each of the walls 22, 24, 26, 28 of the first body extends proximate to and generally parallel to a corresponding wall of the electrical box 100.

Figure 8:
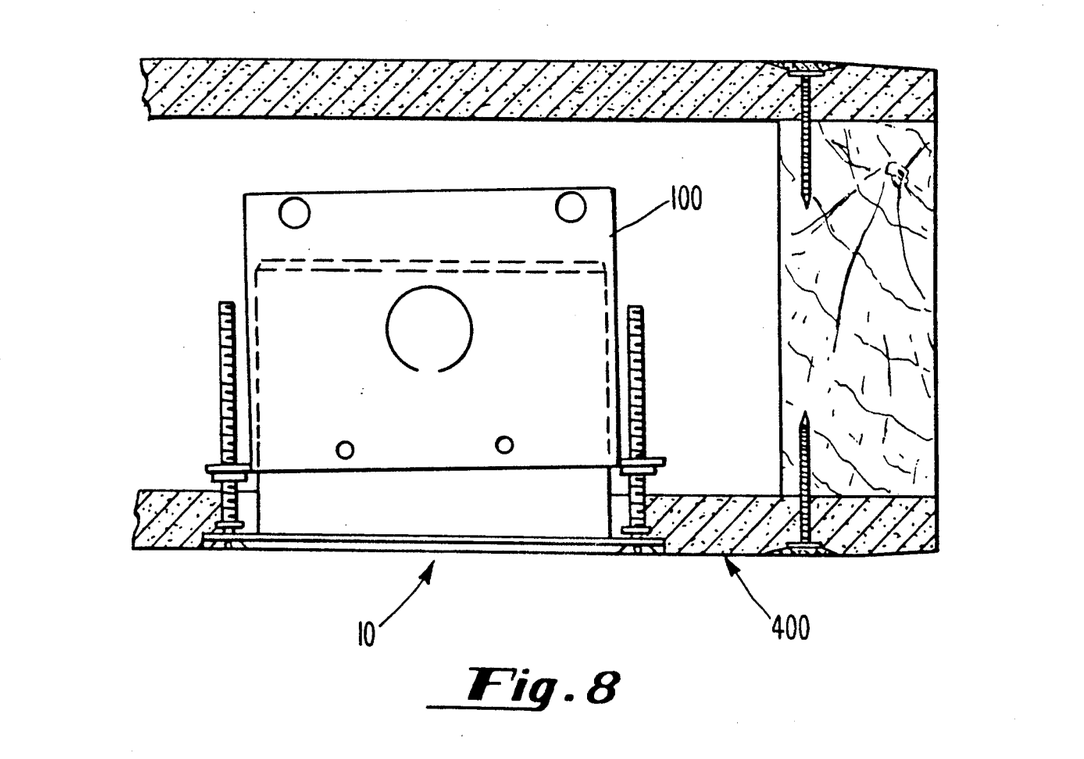
FIG. 8 is a side elevational view of the electrical box extension of FIG. 1 installed to provide a new mounting surface for an electrical device flush with a new wall surface.

FIG. 8 illustrates an electrical box extension 10 according to the present invention affixed to an electrical box 100 permitting installation of an electrical device (not shown) flush with a new surface 400 of a new stud wall, the box 100 being slightly canted with respect to, and lying under, the new surface.

Often the depth of the first body 20 will be sufficient to permit the electrical device to be mounted flush with the new surface (FIG. 8). For example, the first body 20 can permit an extension of up to about 2 inches from the face of the existing electrical box. The front open face of the body 20 can be adjusted to be aligned parallel to the new wall surface, since the face of the existing electrical box may not be so aligned, such as shown in FIG. 8. Similarly, the electrical box extension of the present invention can be use to provide a mounting surface for an electrical device aligned with an existing surface, where the face of the existing electrical box is not aligned parallel to the existing surface.

On occasion a longer extension will be required, as when the new surface includes a layer of decorative bricks or when a new fireplace is being installed. In such cases a second generally tubular body 70 having a fixed depth or thickness can be affixed to the first body 20 (FIG. 2) and the depth of the resulting electrical box extension can be adjusted using the depth adjustment screws 60 associated with the first body 20.

As best seen in FIG. 1, the The second body 70 is similar to the first body 20, in that it includes four generally rectangular walls 72, 74, 76, 78 arranged in two sets of two equally dimensioned and generally parallel walls 72, 74 and 76, 78. Similarly, the second body 70 has a first or front open face 80 an a second of rear open face 82 of generally like dimensions, the rear open face 82 being the same size as the front open face 80, and from each of a pair of walls 76, 78 and generally perpendicular to those walls 76, 78 there extends outwardly a flange 84, 86 proximate the open front face 80 for mounting an electrical device (not shown) in the second body 70, and two additional apertures 154. However, each set of walls 72, 74 and 76, 78 also include proximate the second or rear open face 82 a centrally disposed mounting tab including an aperture 92, 94 and 98 for mounting the second body 70 to the first body 20 by fastening devices 90. One pair of tabs 92, 94 is disposed in the same planes as the respective walls 72, 74 while the other pair of tabs 98 are disposed perpendicular to the planes of the respective walls 76, 78 and extend outwardly from the respective walls 76, 78. The second body 70 is affixed to the first body 20 by fastening devices or screws 90 extending through either the apertures in the first set of tabs 92, 94 and into respective threaded apertures 110, 112 formed in the first body 20 or through the apertures in the second set of tabs 96, 98 and into respective ones of the central, threaded apertures 38 formed in the flanges 34, 36 of the first body 20.

Alternatively, it may be desirable to form the first and second bodies together as a single integral unit, as when a new brick wall in being added over an existing surface, and an extension of 4–6″ is required.

Occasionally the combined depth or thickness of the first and second bodies 20, 70 will not be enough to extend from the existing box 100 to the new surface, or the adjusting screws 60 may be cemented in place and impossible to adjust. However, the electrical box extension of the present invention is modular, in the sense that any thickness can be accommodated by an alternating sequence of first and second bodies. As shown in FIG. 1, a third body 120 identical to the first body 20 can be attached by another set of depth adjustment screws 160 to the respective apertures 154 in the flanges 84, 86 of the second body 70 to further extend the box extension if necessary. Similarly, if necessary, another second body (not shown) could be added to the third body 120, etc.

Figure 4:
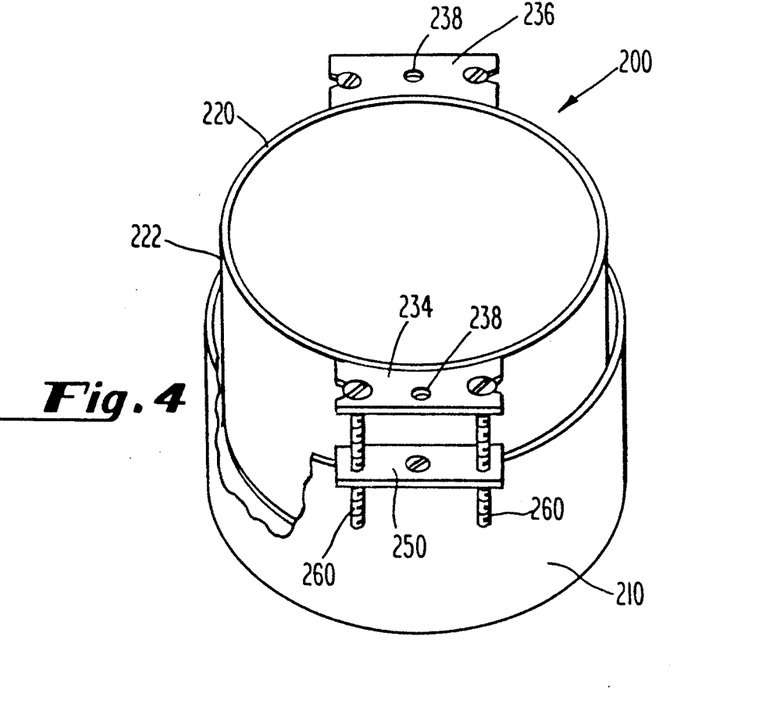
FIG. 4 is a perspective view of a second embodiment of the present invention shown mounted on a circular electrical box.
Figure 6:
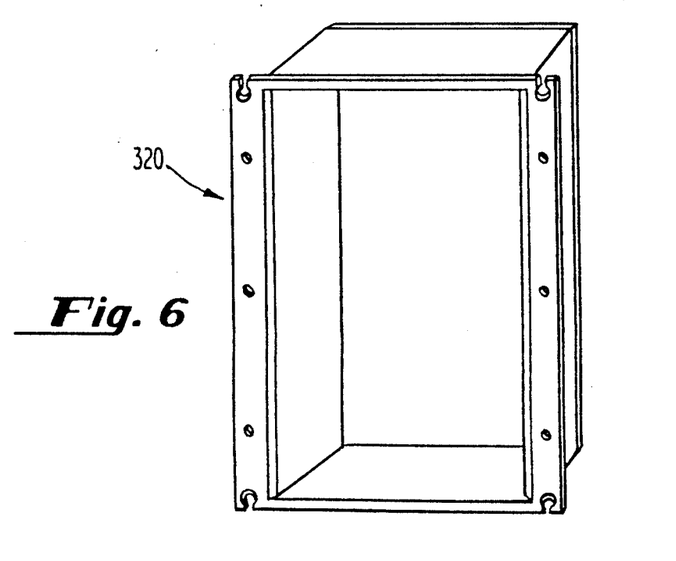
FIG. 6 is a perspective view of the body of another embodiment of an electrical box extension according to the present invention.

The electrical box extension of the present invention can be manufactured for use with an electrical box of any shape or dimensions. For example, circular or cylindrical boxes such as that shown in FIG. 4 can be extended. In this case, a circular first body 220 having a single wall 222 and a pair of opposed outwardly extending flanges 234, 236 is mounted by a set of depth adjustment screws 260 to a pair of attachment bars 250 to a generally circular box 210. Similarly, boxes adapted to receive multiple electrical devices can be extended by box extensions having suitable dimensions. FIG. 6 shows a first body 320 adapted to extend an electrical device box intended to mount three switches or outlets.

Figure 5:
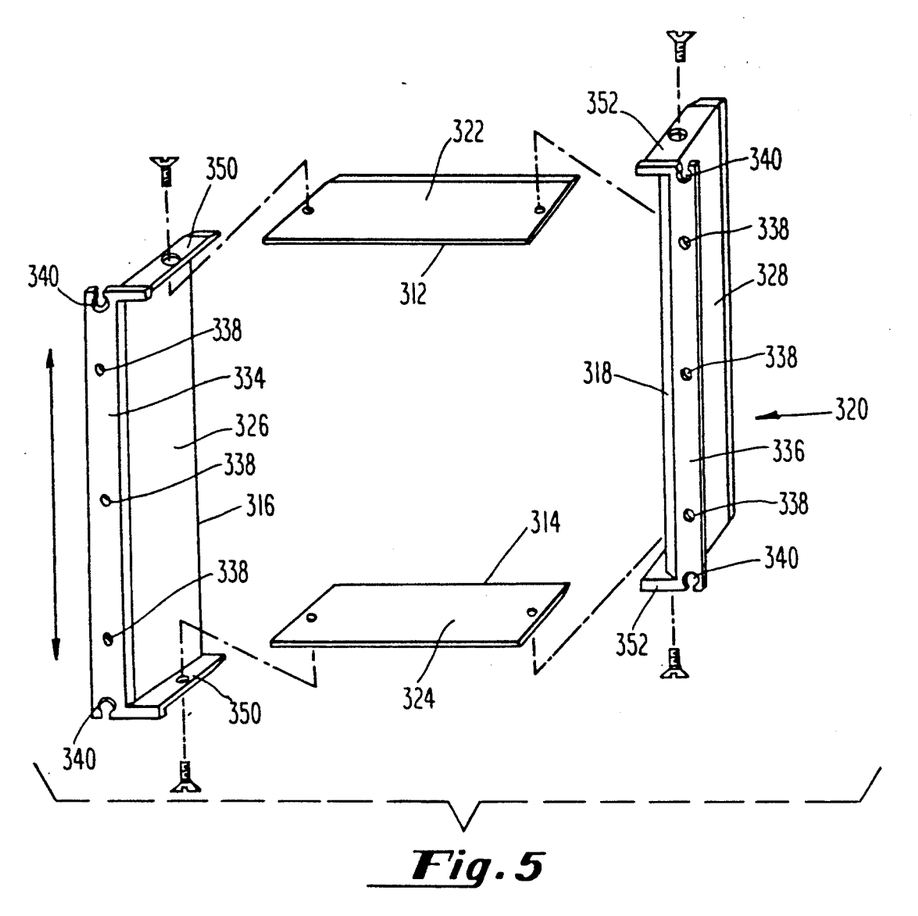
FIG. 5 is an exploded perspective view of a body of a third embodiment of the present invention.

The first and second bodies can be formed integrally, such as in a single molding or casting when made from a thermoformable material, or as when diecut as a single sheet and bent to shape. Alternatively, the first and second bodies can be assembled from a plurality of individual pieces. FIG. 5 illustrates a first body 320 similar to the first body 320 shown in FIG. 6 in an exploded perspective view. However, the first body 320 of FIG. 5 is intergrally molded while the first body 320 of FIG. 6 is constructed of several pieces. The first body 320 of FIG. 5 is assembled from a first pair of sides 312, 314 and a second pair of sides 316, 318. Each side 312, 314, 316, 318 includes a respective rectangular wall 322, 324, 326, and 328. The sides 316, 318 of the second pair each include an outwardly directed flange 334, 336 having three threaded apertures 338 for mounting three electrical devices (not shown) and slotted additional apertures 340 for mounting the first body 340 as well as respective walls 326 and 328. In addition, each of these sides 316, 318 has a pair of inwardly extending flanges 350, 352 each having an aperture for mounting the other set of sides 312, 314. The inwardly directed flanges 350, 352 extend perpendicular to the outwardly directed flanges 334, 336 and perpendicular to their respective walls 326, 328. The sides of the second pair 316, 318 are obviously interchangable with other sides similarly formed but adapted to mount a different number of electrical devices.

FIG. 7 illustrates an electrical box 500 in which the "attachment bars" 510 are molded or formed as integral parts of the box. Such boxes can be provided alone, or together with or assembled with electrical box extensions of the present invention for use in new construction or the like.

In addition to their use in extending electrical boxes, the extension devices of the present invention can be used to extend a wide variety of other types of fixtures which are normally mounted in or extend through a surface when a new surface is applied over an old surface. For example, by altering the shape and dimensions of the generally tubular first body fixtures such as fan housings, phone jacks, heating and air conditioning ducts, rubbish and laundry chutes, manholes, and the like, can be so extended.

Various modifications can be made in the details of the construction and use of the various embodiments of the electrical box extension of the present invention, all within the spirit and scope of the appended claims.

I claim:

1. An electrical box extension comprising:
   a) a generally tubular body having at least one wall and a first open face and a second open face, the body being sized to receive an electrical device and to be received within an electrical box having an open face and at least one wall, the at least one wall extending proximate to and generally parallel to the at least one wall of the electrical box, the body having at least two flanges extending outwardly from at least one wall proximate the first open face, each flange including at least one additional aperture for mounting the electrical device and at least two additional apertures;
   b) at least two attachment bars for mounting the electrical box extension on an existing electrical box, each attachment bar including an aperture for screwing the bar to a flange extending from the existing electrical box, each attachment bar further including at least two additional apertures, the additional apertures of the attachment bars being aligned with the additional apertures of the body flanges; and
   c) a plurality of parallel screw depth adjustment means extending between the body flanges and the attachment bars, each depth adjustment means having a thread-free upper portion and a threaded lower portion, each depth adjustment means being rotatably mounted in one of the apertures of the flanges, and extending through a respective one of the additional apertures of an attachment bar, such that like rotation of each of the depth adjustment means causes the body to move uniformly in or out of an electrical box on which the electric box extension is mounted by a uniform distance proportional to the extent of rotation, the first open face of the box extension being alignable with an existing surface,
   the thread-free upper portion and the threaded lower portion of the depth adjustment means being generally cylindrical, the diameter of the upper portion being smaller than the diameter of the threaded lower portion, the flanges having at least two slots extending to respective ones of the additional apertures to receive the thread-free upper portion of a respective depth adjustment means when the electrical box extension is assembled, the diameter of the at least two additional apertures of said at least two flanges of said body being smaller than the head and the diameter of the threaded lower portion of said depth adjustment means.

2. An electric box extension extension according to claim 1 further comprising:
   d) a second generally tubular body having at least one wall and a first open face and a second open face, the body being sized to receive an electrical device, the at least one wall of the second body extending parallel to the at least one wall of the first body, the second body having at least two flanges extending outwardly from at least one wall proximate the first open face of the second body, each flange of the second body including at least one threaded aperture for mounting the electrical device; and
   e) means for aligning the second, body with the first body and affixing the the second body with the first body; the second body being aligned with and affixed to the first body such that the second open face of the second body is proximate the first open face of the first body, the depth of the electric box extension being extended by the second body by a fixed distance.

3. An electrical box extension according to claim 2 wherein the second body flanges include at least two additional apertures.

4. An electrical box extension according to claim 3 further comprising:
   f) a third generally tubular body having at least one wall and a first open face and a second open face, the third body being sized to receive an electrical device and to be received within the second tubular body, the at least one wall extending proximate to and generally parallel to the at least one wall of the second body, the third body having at least two flanges extending outwardly from at least one wall proximate the first open face of the third body, each flange of the third body including at least one threaded aperture for mounting the electrical device and at least two additional apertures; and
   g) a plurality of parallel screw depth adjustment means extending between the third body flanges and the respective flanges of the first body, each depth adjustment means having a head, a thread-free upper portion and a threaded lower portion, each additional depth adjustment means being rotatably mounted in one of the additional apertures of the third body flanges, and extending through a respective one of the additional apertures of a first body flange, such that like rotation of each of the additional depth adjustment means causes the third body to move uniformly in or out of the second body by a uniform distance proportional to the extent of rotation, the diameter of the at least two additional apertures of said at least two flanges of said third body being smaller than the head and the diameter of the threaded lower protion of said depth adjustment means.

5. An electrical box extension according to claim 1 wherein the body is formed from sheet metal.

6. An electrical box extension according to claim 1 wherein the body is formed from a plastic material.

7. An electrical box extension according to claim 1 wherein the attachment bars are formed from sheet metal.

8. An electrical box extension according to claim 1 wherein the attachment bars are formed from a plastic material.

9. An electrical box extension according to claim 1 wherein the open faces of the body are generally rectangular.

10. An electrical box extension according to claim 1 wherein the body is generally cylindrical.

11. An electrical box extension according to claim 1 wherein the tubular body comprises four rectangular walls including a pair of opposed end walls bearing outwardly directed flanges, the end walls being attached by two side walls.

12. An electrical box extension according to claim 11 wherein each flange includes a plurality of threaded apertures for mounting a respective plurality of electric devices, the extension being adapted for use with electrical boxes mounting a plurality of electrical devices.

13. An electrical box extension according to claim 2 wherein each flange includes two threaded apertures.

14. An electrical box extension extension according to claim 11 wherein the tubular body is assembled from a plurality of sides.

15. In combination, an electrical box and an electrical box extension, the electrical box comprising at least two attachment portions for mounting the electrical box extension comprising:

a) a generally tubular body having at least one wall and a first open face, the body being sized to receive an electrical device and to be received within an electrical box having an open face and at least one wall, the at least one wall extending proximate to and generally parallel to the at least one wall proximate the open face, each flange including at least one additional aperture for mounting the electrical device ad at least two additional apertures;

b) at least two attachment bars for mounting the electrical box extension on an existing electrical box, each attachment bar including an aperture for screwing the bar to a flange extending from the existing electrical box, each attachment bar further including at least two additional apertures, the additional apertures of the attachment bars being aligned with the additional apertures of the body flanges; and c) a plurality of parallel screw depth adjustment means extending between the body flanges and the attachment bars, each depth adjustment means having a head, a thread-free upper portion, and a threaded lower portion, each depth adjustment means being rotatably mounted in one of the apertures of the flanges, and extending through a respective one of the additional apertures of the attachment bar, such that like rotation of each of the depth adjustment means causes the body to move in or out of the electrical box on which the electrical box extension is mounted by a uniform distance proportional to the extent of rotation, the first open face of the box extension being alignable with an existing surface, the thread free upper portion and the threaded lower portion of the depth adjustment means being generally cylindrical, the diameter of the upper portion being smaller than the diameter of the threaded lower portion, the flanges having at least two slots extending to respective ones of the additional apertures to receive the thread free upper portion of a respective depth adjustment means when the electrical box extension is assembled, the diameter of the at least two additional apertures of said at least two flanges of said body being smaller than the head and the diameter of the threaded lower portion of said depth adjustment means.

* * * * *

UNITED STATES PATENT AND TRADEMARK OFFICE
CERTIFICATE OF CORRECTION

PATENT NO. : 5,042,673
DATED : August 27, 1991
INVENTOR(S) : William J. McShane

It is certified that error appears in the above-identified patent and that said Letters Patent is hereby corrected as shown below:

Column 4, Lines 59-60, delete "untreaded" and substitute therefore --unthreaded--.

Column 5, Line 11, delete "intermediate" and substitute therefore --intermediately between--.

Column 9, Line 25, delete "2" and substitute therefore --11--.

Signed and Sealed this

Second Day of March, 1993

Attest:

STEPHEN G. KUNIN

Attesting Officer

Acting Commissioner of Patents and Trademarks